Dec. 28, 1948.　　　　D. B. WOOD　　　　2,457,514
　　　　　　　　AIR POWER WINDMILL

Filed March 6, 1947　　　　　　　　3 Sheets-Sheet 1

Inventor
Daniel B. Wood

Dec. 28, 1948. D. B. WOOD 2,457,514
AIR POWER WINDMILL
Filed March 6, 1947 3 Sheets-Sheet 2
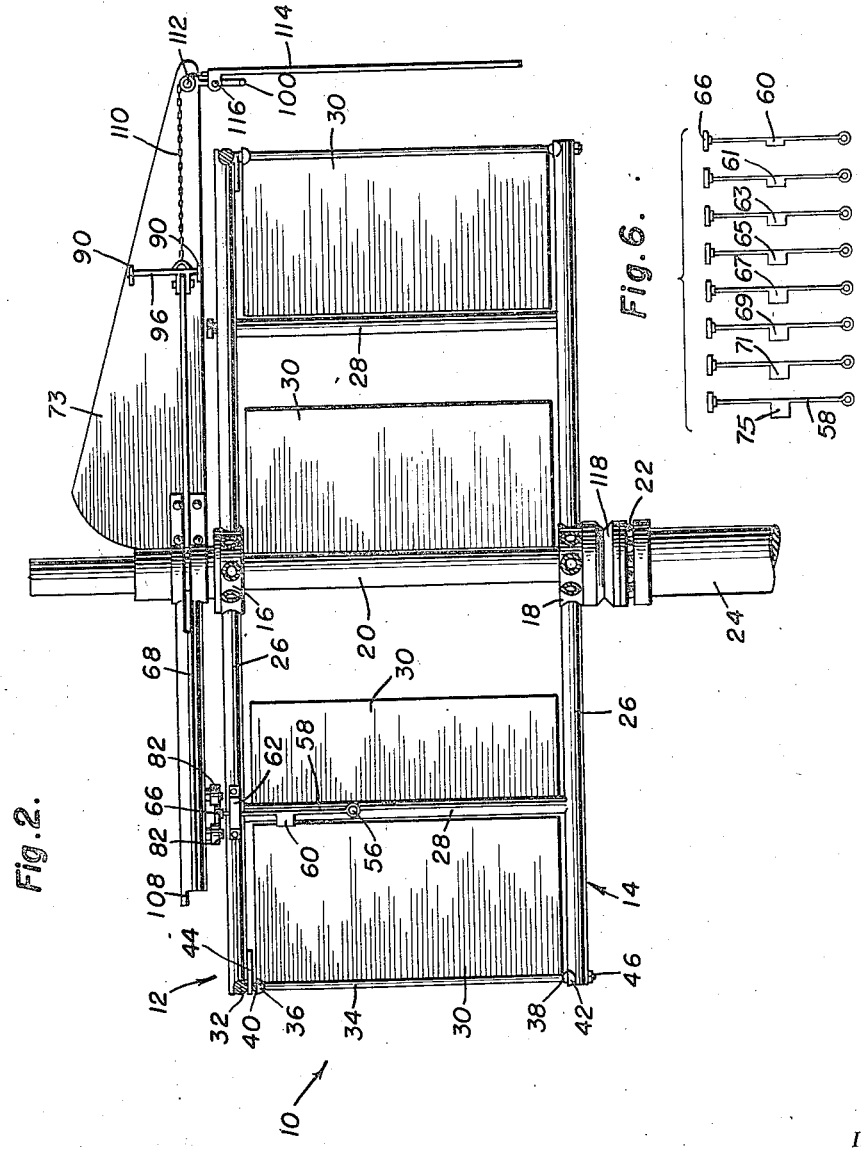
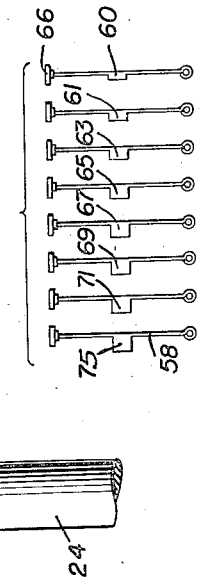
Inventor
Daniel B. Wood Dec. 28, 1948.  D. B. WOOD  2,457,514
AIR POWER WINDMILL
Filed March 6, 1947   3 Sheets-Sheet 3
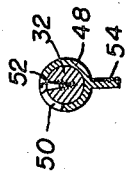
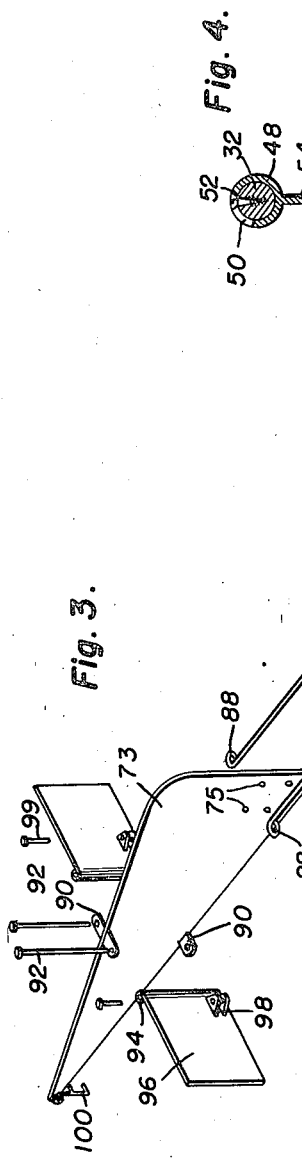
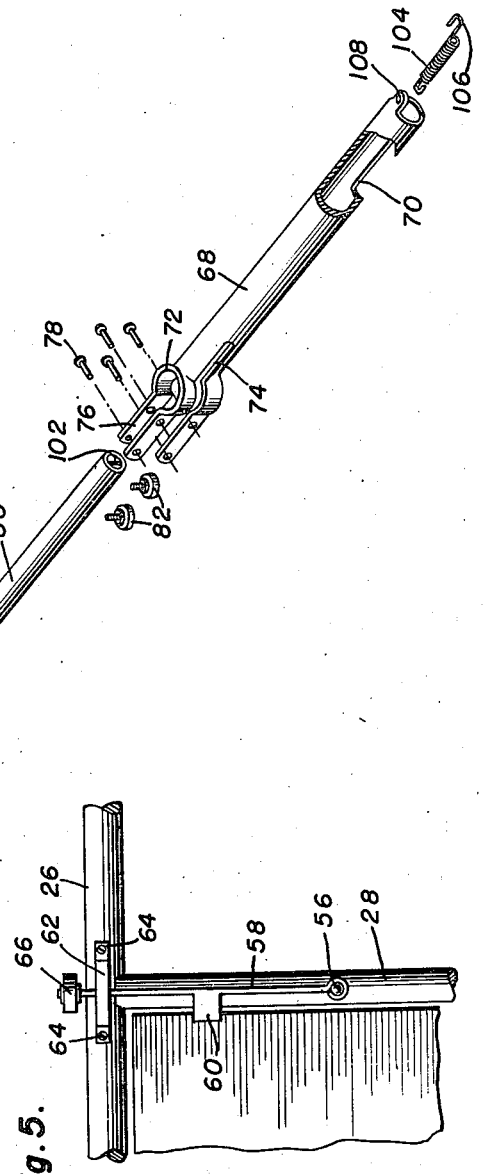
Inventor
Daniel B. Wood Patented Dec. 28, 1948

2,457,514

UNITED STATES PATENT OFFICE 2,457,514

AIR POWER WINDMILL

Daniel B. Wood, Bowling Green, Ky.

Application March 6, 1947, Serial No. 732,898

6 Claims. (Cl. 170—17)

This invention comprises novel and useful improvements in an air power windmill and more especially pertains to an improved and efficient mechanism for deriving power from the velocity of the wind and controlling the same.

The principal objects of this invention reside in providing a wind motor which shall be of relatively simple and inexpensive construction; may be easily assembled and disassembled to facilitate its transportation or storage and enhance its portability and use; which is particularly adapted to be constructed in a variety of sizes and embodiments in accordance with the fundamental principles of the invention; which is provided with a novel governor means for preventing operation of the motor when the wind velocity exceeds a predetermined maximum; and wherein novel means are provided in cooperation with the governor for overriding the same and preventing operation of the device.

These, together with various ancillary objects of the invention which will later become apparent as the following description proceeds, are realized by this invention, the preferred embodiment of which has been illustrated, by way of example only, in the accompanying drawings, wherein:

Figure 2 is a vertical sectional view taken substantially upon the line 2—2 of Figure 1;

Figure 3 is an exploded perspective view of the governing mechanism of the invention;

Figure 4 is a transverse vertical sectional view through one of the fixed stops for the movable vanes of the invention;

Figure 5 is a fragmentary vertical view in elevation illustrating the construction of the movable stop for the vanes;

Figure 6 is a composite view showing in elevation the series of movable stops.

Figure 1:
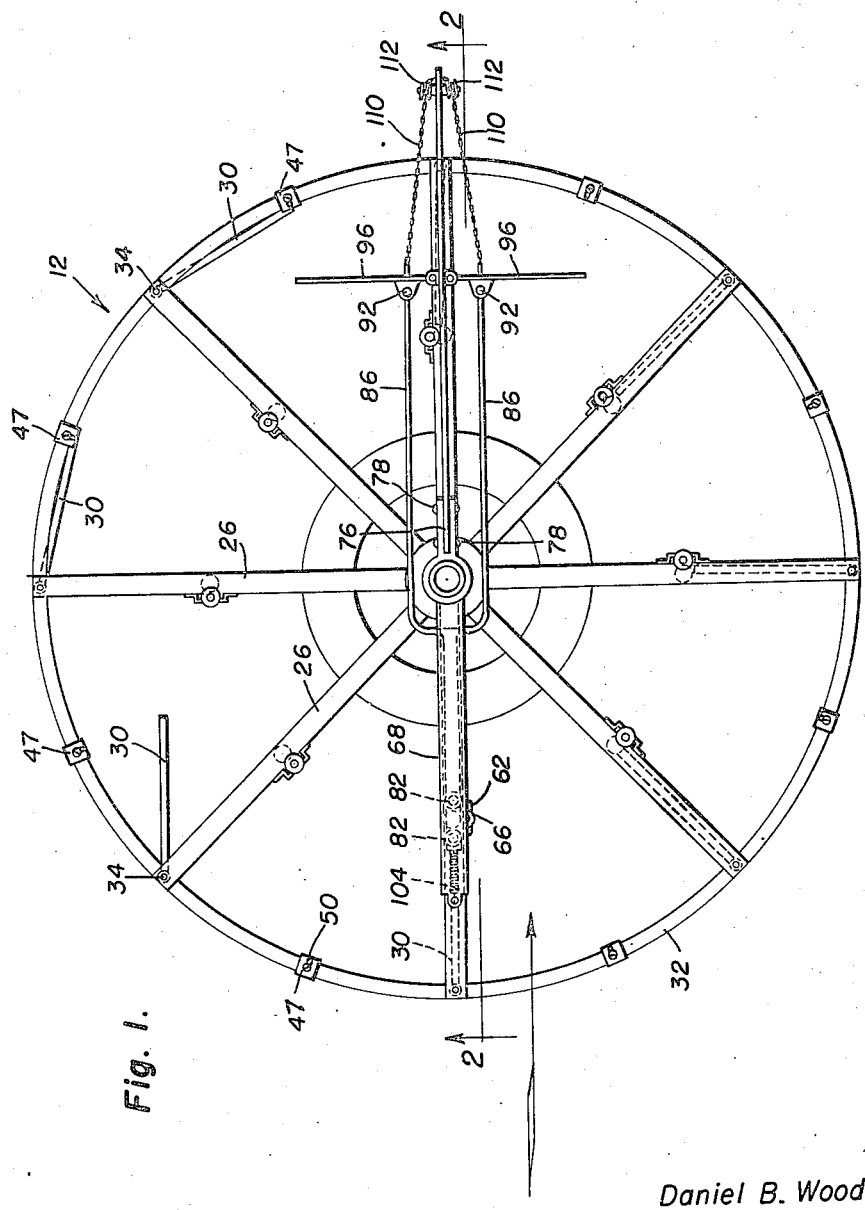
Figure 1 is a top plan view of the device.

Referring now more specifically to the annexed drawings, and in particular first to Figure 2, it will be seen that the present invention embodies a rotor indicated generally at 10 and consisting of vertically spaced parallel upper and lower wheel-like members 12 and 14 respectively and which are provided with hub portions 16 and 18 rigidly attached to a vertical axle 20 journaled as by means of anti-friction bearings 22 upon a vertical support standard 24 of any suitable stationary construction.

As shown best in Figure 1, each of the wheel members 12 and 14 consists of a plurality of radially disposed spokes 26 extending laterally from the hubs 16 and 18. At suitable positions intermediate their ends, the corresponding spokes of the upper and lower wheel members 12 and 14 are rigidly connected by a vertically disposed strut 28 to cause the wheel members to form a rigid unitary construction comprising the above mentioned rotor.

A plurality of movable vanes 30 are pivoted between the upper and lower wheel members 12 and 14 at the outer extremities of each of the spokes 26. As shown more clearly in Figure 1 and indicated in Figure 2, the spokes 26 are connected at their outer terminals as by an annular rim 32 which serves to rigidify the structure and also to support a plurality of fixed stops to be later set forth.

Attention is now directed particularly to Figure 2 for an understanding of the construction of the pivoting connection of the vanes 30 to the wheel members 12 and 14. The vanes 30 are integrally formed with or otherwise rigidly attached to vertical axles or pivots 34 which at their upper ends are provided with hemispherical sockets or recesses 36 while their lower ends are provided with hemispherical ball shaped members 38. The members 36 and 38 are engaged by complementary ball and socket members 40 and 42 respectively rigidly attached as by welding or else integrally formed in adjacent surfaces of each of the spokes 26 at their outer extremities. If desired, the ball member 40 may be carried by plates 44 welded to the lower surface of the wheel member 12, while the sockets 42 may be formed upon bolts which are received through the spokes of the lower wheel member 14 and detachably secured thereto as by nuts 46.

By this construction, it will be seen that the vanes 30 are each pivoted for horizontal swinging movement about their vertical axles 34 at the extremity of each of the spoke members 26 between the upper and lower wheel members 12 and 14 in a manner to be subsequently set forth.

As shown best in Figure 1, a plurality of fixed stops 47 are secured upon the periphery or annular rim 32 of the upper wheel member 12 in a suitable position to be engaged by the upper edges of the oscillatable vanes 30. For a detailed consideration of the construction of the fixed stops 47, reference is made to Figure 4 wherein it will be seen that each stop comprises a tubular sleeve 48 having a circumferential slot 50 extending therethrough, while a fastening screw 52 rides in this slot and is engaged in the rim 32. A depending radially extending lug 54 extends from the sleeve 48.

The arrangement of the slot 50, the depending lug 54 and the fastening means 52 is such that the lug 54 is positioned directly vertically below the rim 32 in such a position as to be engaged by the vane 30 as the latter pivots about its axis and moves radially outwardly from the axle 20. The fastening means 52 normally engages that end of the slot 50 which will prevent the downwardly extending lug 54 from yielding to regular outward movement of the engaging surface of the vane 30. However, the slot 50 will permit reverse movement of the lug, and will allow a vane whose edge extends outside the periphery of the wheels to move inwardly and radially of the wheels, the lug 54 yielding to this movement. It will thus be seen that the fixed stops prevent or limit outward movement of the vanes past the confines of the rim of the wheels but permit inward movement thereof.

Attention is next directed to the additional stop means which is employed to render certain desired vanes effective for imparting rotation to the rotor together with constructural features thereof by means of which the device may be made inoperative in response to wind velocity exceeding a predetermined maximum or in response to manual manipulation.

For this purpose, attention is first directed to Figure 5, which shows the constructional features of the adjustable stop. Pivoted to each of the vertical brace rods 28 extending between the upper and lower wheel members, as by a pivot or fulcrum 56, is a vertically extending shaft 58 provided with a laterally extending lug 60 which is adapted for oscillation of the pivot 56 in a plane which is radial to the vertical axle 20 and is closely parallel to that of the spoke member 26. Shaft 58 extends through guide brackets 62 secured as at 64 to the side of the spoke 26, and is provided with a freely journaled roller 66 at the upper end thereof. The arrangement is such that the shaft 58 may be given a limited radial movement about the pivot 56 and within the confines of the guide bracket 62. This movement is such that in the position shown in Figure 5, the lug 60 is interposed into the path of oscillation of a vane 30 to thereby prevent the vane from passing beyond its radial spoke 26, to thereby provide an abutment by which the force of the wind which is in the direction of the arrow as shown in Figure 1, may impart movement to all of those vanes lying on the right of the direction of wind movement, except as hereinafter set forth. However, when by a means to be subsequently set forth, the roller 66 and shaft 58 are urged radially inwardly along the guide bracket 62 and spoke 26, the lug 60 will be disengaged from the inward edge of the vane 30 whereby the latter is free to pass beyond its radial yoke 26 and thereby be rendered inoperative for receiving the thrust of the wind.

Attention is next directed to Figures 1 and 2 and particularly to Figure 3.

The control means for actuating the adjustable stop means consists of a tubular body or casing member 68 provided at its forward end with a longitudinally extending guide slot 70 and adjacent its rear end provided with a cylindrical vertically disposed enlargement 72 constituting a bore for free journaling engagement upon the upper end of the axle 20. The rear end of the body 68 is horizontally slotted as at 74 to a position inwardly of the bore 72 to provide a bifurcated rear end portion. The upper and lower members of this bifurcation are again bifurcated or slotted by a longitudinal vertical plane as at 76 to provide pairs of straps. Freely and longitudinally slidable in the body 68 is a tubular rod or shaft 80 which at its upper end is provided with a pair of longitudinally spaced roller members 82, the axles of these rollers being disposed and extending through the guiding slot 70 while the rollers themselves extend below the body portion 68 for engagement with the roller 66 in a manner to be subsequently set forth. At its rear end, the tubular rod 80 is provided with laterally extending arms 84 freely swiveled therein, from which extend rearwardly extending members 86 terminating in eyes 88. A weather or wind vane 73 of conventional triangular shape, is received within the vertical slot or bifurcation 76 and is provided with a plurality of apertures 75 adapted to align with the apertures in the rear portion of the body 68 and to be retained therein as by means of rivets 76 or the like. Intermediate its length, the rudder fin 73 is provided with laterally extending lugs or ears 90 suitably apertured to receive pins 92 upon which are hinged inturned portions 94 of laterally extending fins 96. These fins are provided with pairs of forwardly extending lugs 98 suitably apertured for engagement by pivot pins 99 which extend through the aforementioned eyes 88 and lugs 98. It will thus be seen, that in response to longitudinal movement of the tubular shaft 80, the fins 96 are oscillated longitudinally upon their pivot pins 99 upon the rudder fin 73. At its rear end, the rudder fin 73 has a pivoted hook 100 depending therefrom. At its forward end, the tubular shaft 80 has a diametrically disposed pin 102 constituting a means for attaching a spring 104 to the shaft 80 while the spring 104 has a hook 106 at its forward end engageable in an apertured lug 108 at the forward extremity of the body 68, while the rear end of spring 104 is to be hooked over the pin 102. By this construction, the shaft 80, rods 86 and fins 96 are yieldingly urged forwardly of the body member 68 for a purpose to be later set forth.

As will be readily understood, the fin vane 73 which is rigidly attached to the body 68 causes the latter to swivel or pivot about its axle 20 in accordance with the direction of the wind. This swiveling movement is for the purpose of positioning the actuating rollers 82 into a position which is in alignment with the direction of the wind whereby the same may engage the actuated rollers 66 in a properly timed manner.

As shown in Figures 1 and 2, a pair of chains or cables 110 are suitably attached to the rear surfaces of the lateral fin 96, these chains passing over pulleys 112 and being attached to a handle or weight 114. The latter is provided with a laterally extending pin 116 adapted to be selectively engaged in the notches of the hook member 100. As will be evident, when the control member 114 is positioned so as to draw the chains 110 to the rear of the rudder fin, the lateral fins 96, the rod members 86 and the tubular rod 80 are all drawn rearwardly of the casing 68 in opposition to the spring 104, thereby moving the actuating rollers 82 which are disposed upon the other side of the axle 20, radially inwardly of the wheel members.

It should be here noted that the lateral fins 96 are of such area, their lever arm is so chosen and the spring 104 is so tensioned that when these fins are subjected to a wind velocity exceeding a predetermined maximum, they will pivot about their fulcrums 92 causing thereby a radial outward movement of the members 86 and the tubular shaft 80, thereby urging the rollers 82 radially inwardly of the wheel members for a purpose to be subsequently set forth. It may thus be seen that the governing or controlling action of the wind motor, consists in operating the adjustable stop means having a control lug 60, by means of radial movement of the actuating rollers 82.

The operation of the device is as follows:

The rudder fin 73 causes the governor controlling means to be always aligned with the direction of the wind indicated by the arrow in Figure 1. The velocity of the wind will now pivot those vanes 30 which are disposed upon the right side of Figure 1 as viewed in the direction of the arrow of the wind direction, until they engage the adjustable stop lugs 60. At this point, they become abutted against their corresponding spokes 26 and the impact or force of the wind applied to these vanes produces a counter-clockwise direction of rotation of the rotor 10. As soon as each of the vanes completes one-half of its travel about the axle 20, the vane pivots, upon exposure of its other side to the direction of the wind blow, to the position indicated upon the left side of Figure 1 whereby the vanes will trail their corresponding spokes. In this trailing movement, the operation of the vanes is stopped by the fixed stops 46, thereby preventing the passage of the vanes from beyond the periphery of the rim 32. It will be seen that this operation is permitted as long as the stop lug 60 is interposed in the path of oscillation of the vanes 30, or in other words as long as the lug 60 and its shaft 58 are in the position indicated at Figure 5. During this rotation, and operation as above mentioned, the actuating rollers 82 are so positioned that the actuated roller 66 in the position shown in Figure 5, is free to pass therebetween during each revolution of the rotor. However, in response to actuation of the manual control means 114, or the impact of excessive wind velocity upon the lateral fins 96, the tubular shaft 80, members 86 and rollers 82 may be shifted radially of the body 68. Normally the spring means 104 will be of sufficient tension to so position these actuating rollers 82 that the actuated rollers 66 are free to pass therebetween as aforementioned. However, if the actuated rollers 82 are shifted from their normal position, each of the actuated rollers 66 in attempting to pass therebetween, will be urged radially inwardly of the spoke 26, thereby causing the retraction of the stop lug 60 from the path of oscillation of the vanes 30. Consequently, each of the vanes 30 will be free to assume a position which is parallel to the direction of the wind and consequently would impart the rotational thrust upon the rotor. It will of course be understood that when the vanes 30 swing freely in the manner just described, their outer edges will pass beyond the confines of the rims 30, this movement being permitted by the stops 46.

It will thus be seen that excessive wind velocity will cause the adjusting means to release the abutment means for the oscillating vanes, thereby preventing movement of the rotor by the wind; and manual manipulation of the member 114 will perform the same operation. When however the wind velocity is within the predetermined maximum limit, and the manual means is disengaged, the aforementioned governor means will permit the automatic operation of the device regardless of the change in direction of the wind.

Power may be taken from the wheel member hubs 16 or 18 by any suitable means, such as pulleys, gears or the like as indicated at 118.

As shown in Figure 6, each of the movable stops 60 is of a different size, whereby a different amplitude of lateral movement of each is required to permit release of the corresponding vane. Thus it will be seen that as the member 80 commences to retract, under the action of the wind velocity on the members 96, the stops 60, 61, 63, 65, 67, 69, 71, 75 are progressively disengaged from the vanes 30, the stop 60 having the minimum width being disengaged first, and the others in the order of their increasing widths, whereby the vanes are successively released in accordance with the wind velocity and/or power desired from the apparatus as the manual control of the tension on spring 104 is regulated.

Obviously, the series of stops 60 need not be spaced in the order of their successive sizes about the wheel, but various arrangements may be resorted to in the interests of balancing the torque on the wheel as various stops are released.

Since numerous embodiments of the principles of this invention will be readily apparent to those skilled in the art, it is not intended to limit the protection sought to the actual construction as set forth in the appended drawings and specification, but all suitable modifications and equivalents may be resorted to falling within the scope of the appended claims.

What is claimed as new is as follows:

1. A wind motor comprising a rotor, a plurality of vanes journaled thereon, a plurality of fixed stops on said rotor for limiting pivotal movement of said vanes and additional means for selectively limiting the pivotal movement of said vanes, said rotor comprising a pair of vertically spaced, spoked wheels horizontally rotatable, said vanes being pivoted to the rims of said wheels, said fixed stops being carried by one of said wheels and said additional means being carried by the spokes of said wheels, vertical axles pivoted upon the spokes of one wheel, guide means upon the spokes of the other wheel providing for limited radial movement of said axles and vane stops carried by said axles and engageable with said vanes, an actuated roller on said axles, said control means being radially adjustable and having a pair of actuating rollers engageable with said actuated roller.

2. A wind motor comprising a rotor, a plurality of vanes journaled thereon, a plurality of fixed stops on said rotor for limiting pivotal movement of said vanes and additional means for selectively limiting the pivotal movement of said vanes, and adjusting means for positioning said additional means to prevent their limiting pivotal movement of said vanes, said adjusting means including a body pivoted for movement about the axis of rotation of said rotor, a rod slidable in said body, rollers carried by said rod and selectively engageable with said additional means for successively positioning the same in operative and inoperative condition.

3. A wind motor comprising a rotor, a plurality of vanes journaled thereon, a plurality of fixed stops on said rotor for limiting pivotal movement of said vanes and additional means for selectively limiting the pivotal movement of said vanes, and adjusting means for positioning said additional means to prevent their limiting pivotal movement of said vanes, said adjusting means including a body pivoted for movement about the axis of rotation of said rotor, a rod slidable in said body, rollers carried by said rod and selectively engageable with said additional means for successively positioning the same in operative and inoperative condition, said body having a guide slot, said rollers extending through said slot.

4. A wind motor comprising a rotor, a plurality of vanes journaled thereon, a plurality of fixed stops on said rotor for limiting pivotal movement of said vanes and additional means for selectively limiting the pivotal movement of said vanes, and adjusting means for positioning said additional means to prevent their limiting pivotal movement of said vanes, said adjusting means including a body pivoted for movement about the axis of rotation of said rotor, a rod slidable in said body, rollers carried by said rod and selectively engageable with said additional means for successively positioning the same in operative and inoperative condition, and resilient means in said body biasing said rod and rollers into position to adjust said additional means into vane limiting position.

5. A wind motor comprising a rotor, a plurality of vanes journaled thereon, a plurality of fixed stops on said rotor for limiting pivotal movement of said vanes and additional means for selectively limiting the pivotal movement of said vanes, and adjusting means for positioning said additional means to prevent their limiting pivotal movement of said vanes, said adjusting means including a body pivoted for movement about the axis of rotation of said rotor, a rod slidable in said body, rollers carried by said rod and selectively engageable with said additional means for successively positioning the same in operative and inoperative condition, and resilient means in said body biasing said rod and rollers into position to adjust said additional means into vane limiting position, and manual means to override said spring means and render said vane additional means inoperative.

6. A wind motor comprising a rotor, a plurality of vanes journaled thereon, a plurality of fixed stops on said rotor for limiting pivotal movement of said vanes and additional means for selectively limiting the pivotal movement of said vanes, and adjusting means for positioning said additional means to prevent their limiting pivotal movement of said vanes, and pressure responsive means for preventing actuation of said adjusting means in response to exposure of said rotor to a wind velocity of a predetermined maximum, and control means for positioning said pressure responsive means in abutment with the direction of the wind, said control means including a wind rudder and said pressure responsive means comprising fins pivoted laterally to said rudder.

DANIEL B. WOOD.

REFERENCES CITED

The following references are of record in the file of this patent:

UNITED STATES PATENTS

| Number | Name | Date |
|---|---|---|
| 247,266 | Miller | Sept. 20, 1881 |
| 848,522 | Whitner | Mar. 26, 1907 |
| 1,075,060 | O'Toole | Oct. 7, 1913 |